United States Patent [19]

Riquart et al.

[11] Patent Number: 4,503,954

[45] Date of Patent: Mar. 12, 1985

[54] DRUM BRAKE WITH CONTROLLED TORQUE AND TORQUE CONTROL VALVE FOR SUCH A BRAKE

[75] Inventors: Christian Riquart, Paris Gérard Volan, Velizy; Pierre Pressaco, La Courneuve, all of France

[73] Assignee: Societe Anonyme D.B.A., Paris, France

[21] Appl. No.: 327,149

[22] Filed: Dec. 3, 1981

[30] Foreign Application Priority Data

Dec. 11, 1980 [FR] France .............................. 80 26283

[51] Int. Cl.³ .......................... B60T 11/12; B60T 11/34
[52] U.S. Cl. .................................... 188/331; 188/364; 188/349
[58] Field of Search ................ 188/331, 332, 333, 347, 188/346, 181 T, 361, 351, 362, 349, 363, 364, 196 A, 79.5 P, 141, 326, 325; 91/422, 517, 433, 468, 29; 92/75; 60/591; 303/6 C

[56] References Cited

U.S. PATENT DOCUMENTS

| 3,047,099 | 7/1962 | Dahle | 188/331 |
| 4,286,504 | 9/1981 | Carre et al. | 188/364 X |
| 4,292,883 | 10/1981 | Riquart et al. | 188/349 X |

*Primary Examiner*—Douglas C. Butler
*Attorney, Agent, or Firm*—Larry J. Palguta; Ken C. Decker

[57] ABSTRACT

The brake comprises a torque control valve comprising a main piston which cooperates via a bearing piece with a shoe of which the bearing force is representative of the torque supplied by the brake during operation of the brake motor. The main piston controls the pressure admitted to the brake motor by a cut-off valve responsive to displacement of the main piston and by a variable volume decompression chamber of which a movable wall decompresses the fluid contained in the brake motor when the torque generated by the brake exceeds the limit of a predetermined torque-pressure law.

34 Claims, 8 Drawing Figures

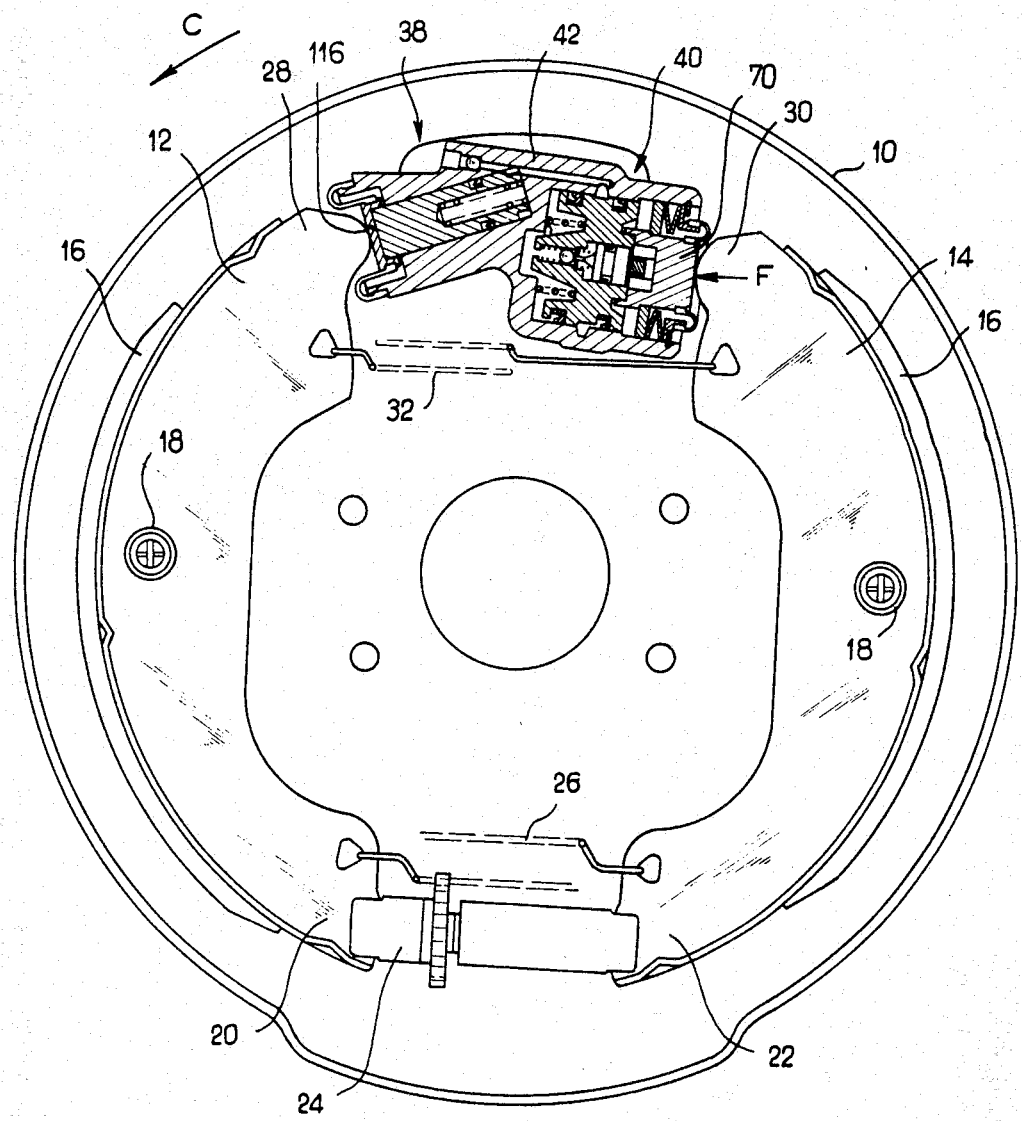
FIG_1

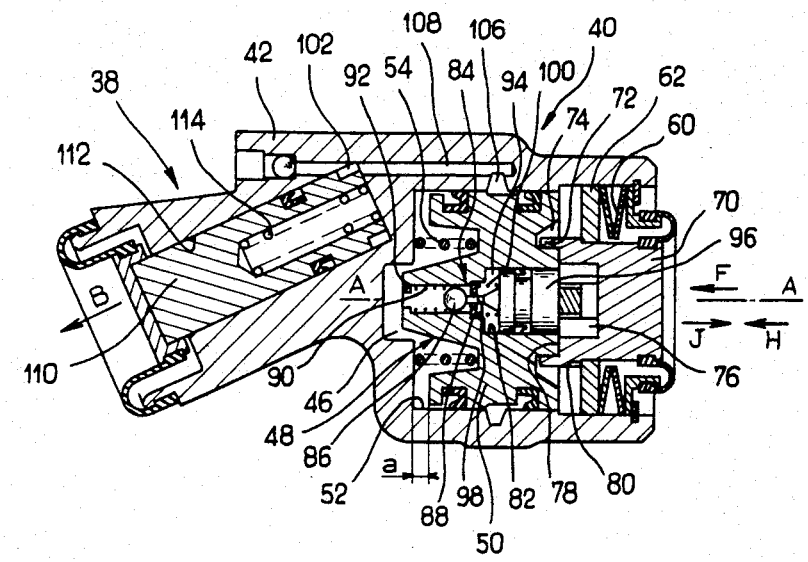
FIG_2
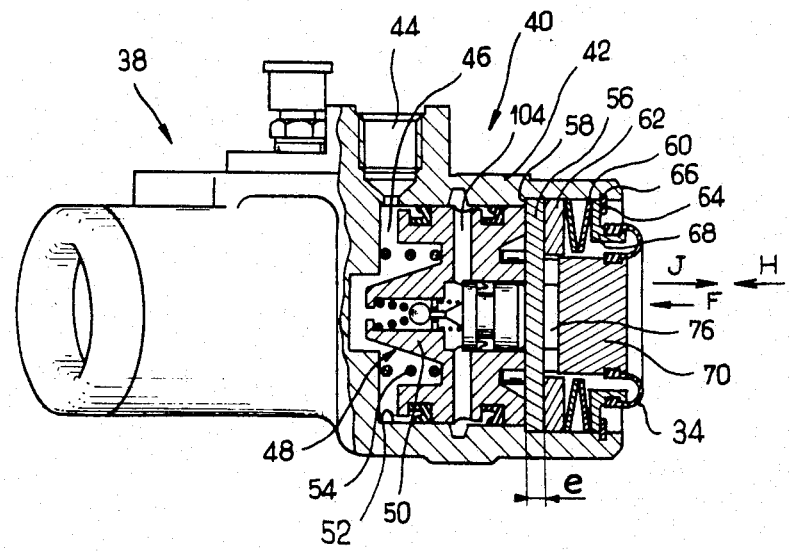
FIG_3

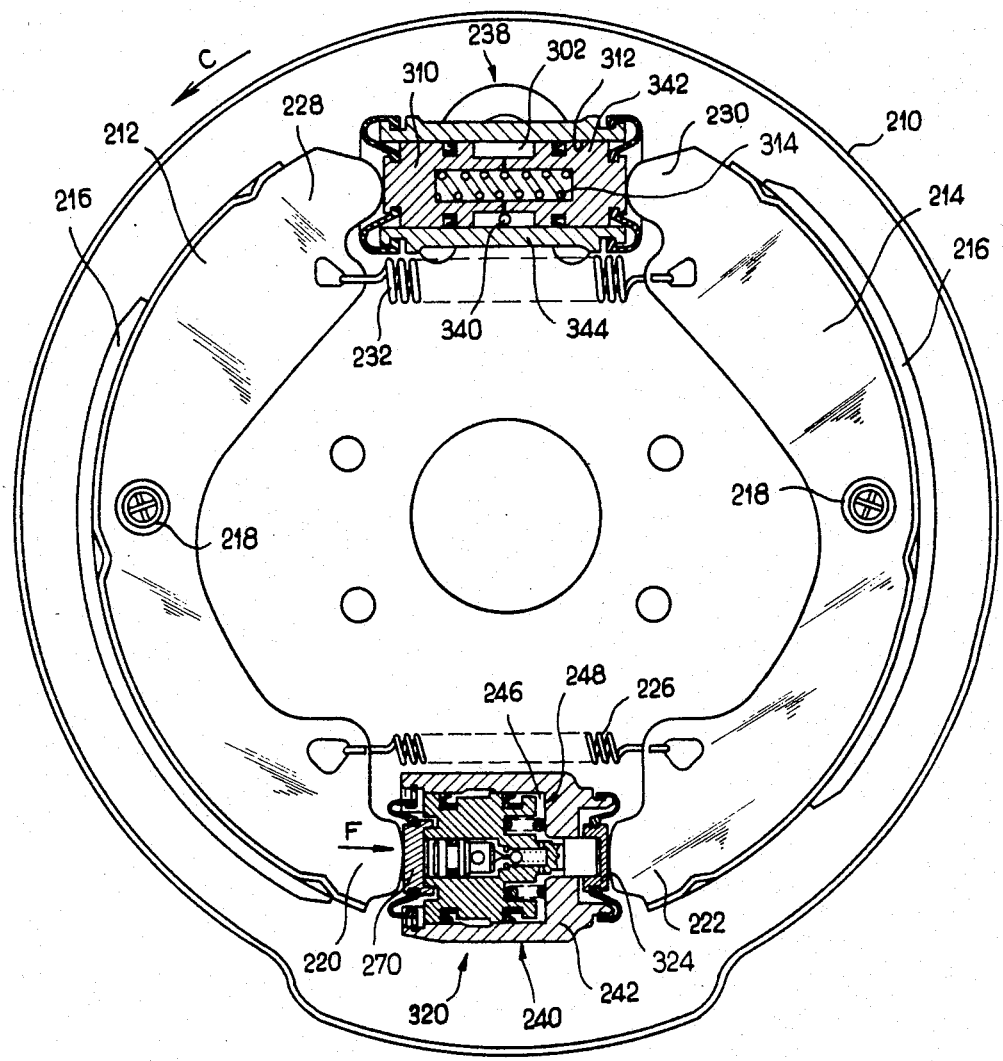
FIG_4

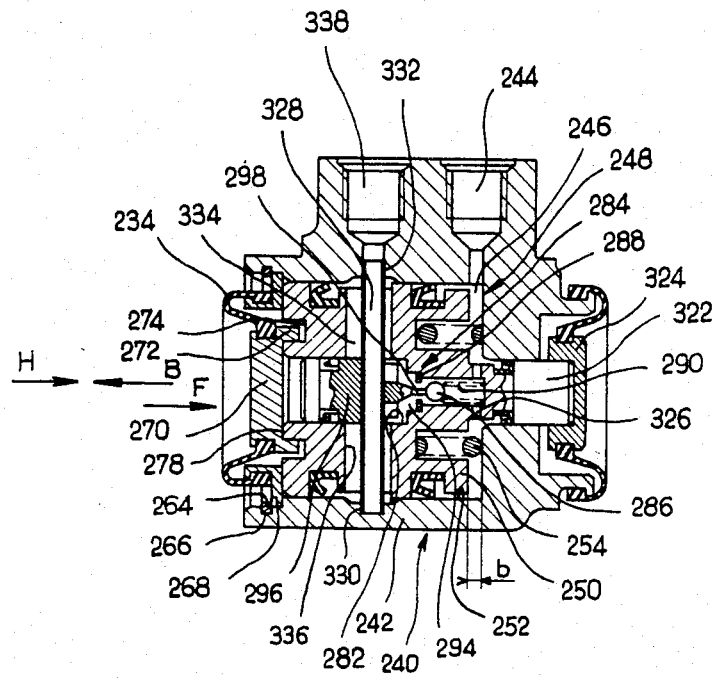
FIG_5

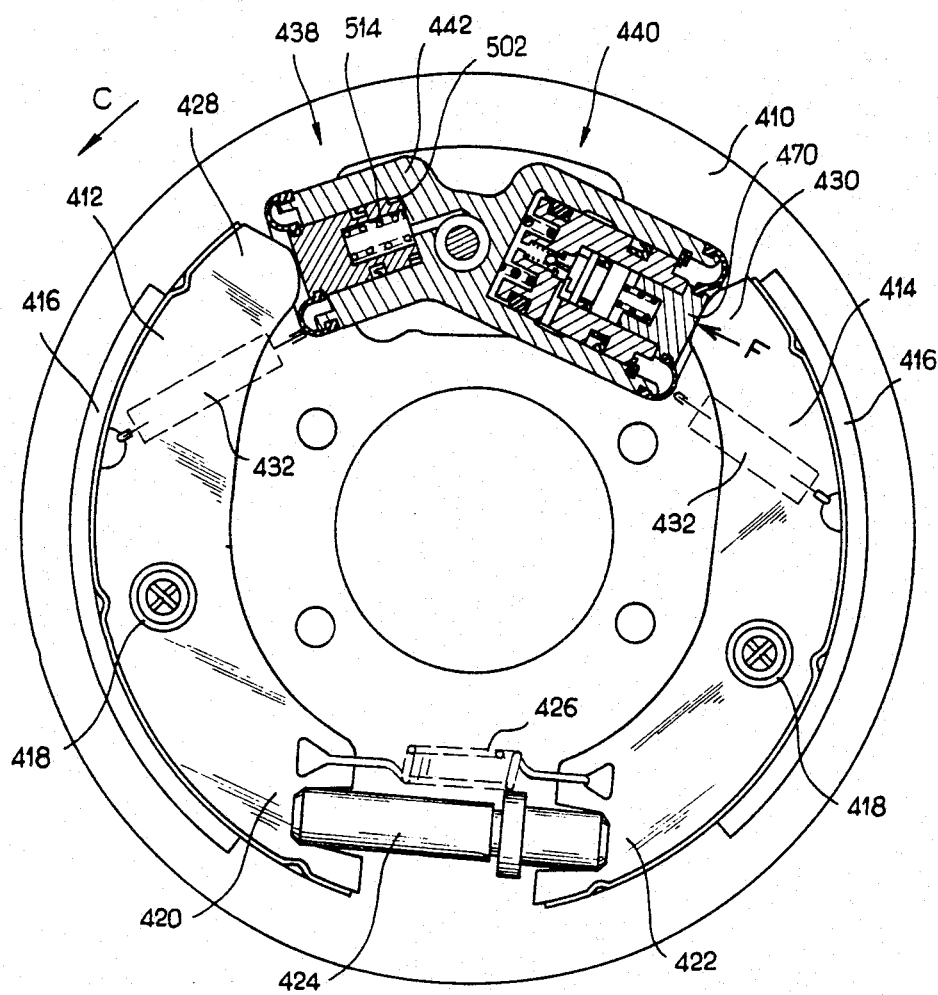
FIG_6

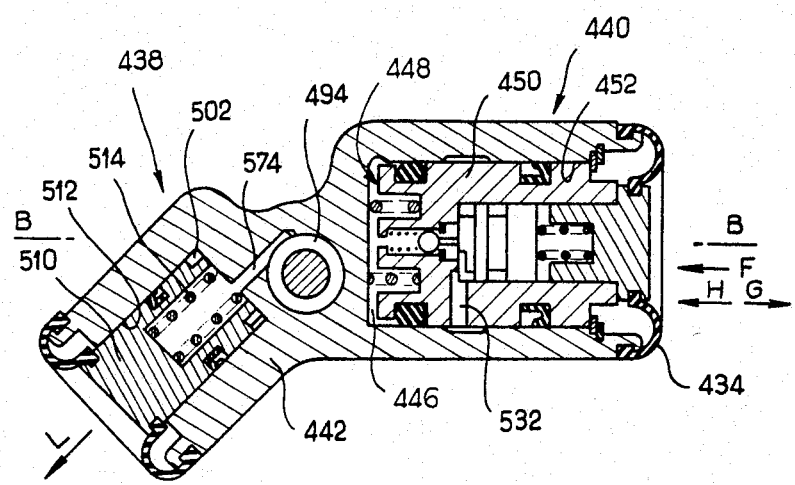
FIG_7
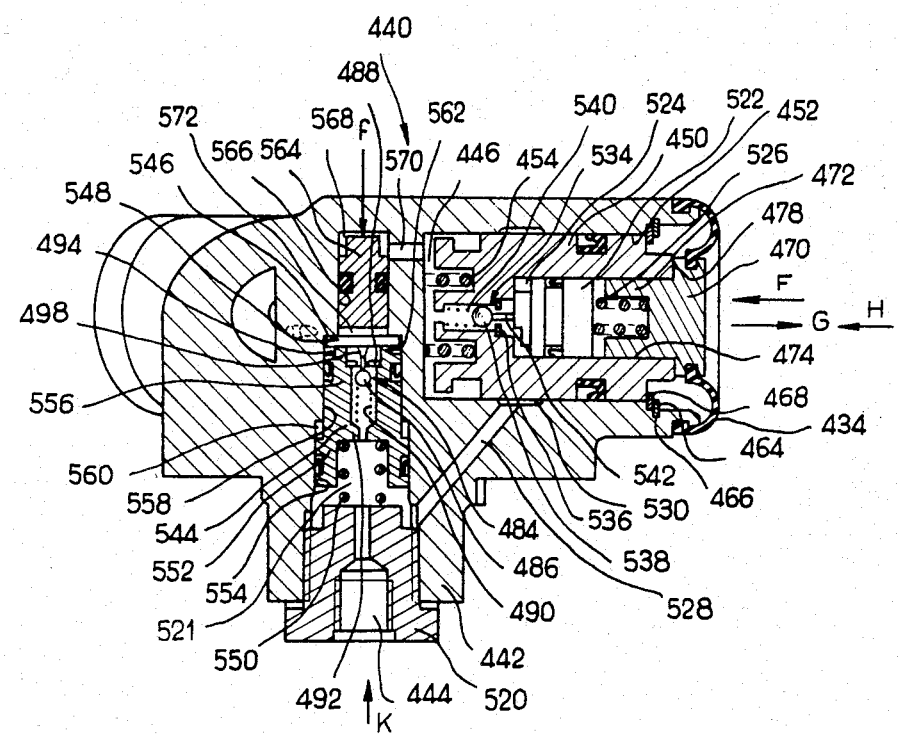
FIG_8

DRUM BRAKE WITH CONTROLLED TORQUE AND TORQUE CONTROL VALVE FOR SUCH A BRAKE

The invention relates to a drum brake with controlled brake torque, particularly for an automobile vehicle, and a torque control valve for such a brake.

The invention concerns generally a drum brake including two shoes capable of generating a brake torque by frictional engagement with a rotating drum by the action of a brake motor.

The invention concerns particularly a torque control valve capable of being used in such a brake.

It is known that a drum brake exhibits a certain number of disadvantages, in particular the brake torque obtained for a given driving force depends, inter alia, on the quality of the friction material, the temperature, the atmospheric conditions and the surface state of the friction track of the drum. In spite of the care taken in selection of friction materials to obtain a brake torque as stable and regular as possible, this problem is not completely solved. In fact, a brake associated with a drum of which the friction track exhibits a high degree of roughness will provide for a given pressure a torque greater than the torque which the same brake would have provided in association with a drum of which the track exhibits a low degree of roughness. These uncontrolled variations in torque for a given driving pressure may cause instability of the vehicle during braking, due to the fact that two brakes on the same axle may exhibit perceptibly different brake torques, or indeed that two brakes on the same axle exhibit torques sufficiently different to the nominal torques provided for the equlibrium between axles to be upset; this instability being capable in extreme cases of causing loss of control of the vehicle.

It has already been attempted to solve this problem by effecting servo control of the torque measured on the shoes as a function of a driving pressure by a system of counterpressure, the use of counterpressure in the brake motor resulting in opposition to the actuating force developed by the brake motor (see in particular U.S. Pat. No. 3,047,099 filed on Nov. 17, 1958 by Edwin A. Dahle). The solution proposed nevertheless exhibits the disadvantages of a limited control range and large overall dimensions.

In comparison with the prior art, our system proposes a torque control valve comprising a cut-off valve and a variable volume decompression chamber which effect automatic regulation of the working pressure admitted to the brake motor as a function of the torque effectively generated by the brake.

The invention relates to a drum brake of the type comprising two shoes actuated by a hydraulic brake motor and a fluid inlet port for connection to a driving pressure source, characterized in that it comprises a torque control valve defined in a fixed body accommodating a cut-off valve inserted between said inlet port and said hydraulic brake motor and accommodating a variable volume decompression chamber communicating with said hydraulic brake motor, a movable portion of said decompression chamber is notably maintained in equilibrium between first actuating means linked to one of said shoes and second actuating means responsive to a driving pressure established at said inlet port, and said cut-off valve is driven by said movable portion.

The invention likewise shows the possibility of increasing the diameter of the brake motor in such a way that the latter can provide the desired torque even if the friction elements exhibit a reduction in friction coefficient causing a reduction in efficiency of the brake. The increase in diameter of the brake motor will be defined by the predictable lower limit of reduction in efficiency of the brake.

In the embodiments of the present invention, the brake comprises a torque control valve, for at least one of said shoes, capable of controlling the pressure in the brake motor to obtain a brake torque proportional to the driving pressure within the limits defined during dimensioning of the different elements of the brake.

Moreover, the hydraulic circuit of the invention is not modified, and further, no modification takes place on the fixed portion of the vehicle receiving the brake supporting plate. It will be noted that the overall dimensions of the brake are not affected.

Three embodiments will now be described by way of example without limitation, referring to the attached figures in which FIGS. 1 to 3 represent one embodiment, FIGS. 4 and 5 a second embodiment and FIGS. 6 to 8 a third embodiment:

FIG. 1 is a front view of a drum brake of the duo servo type effected according to the invention, of which certain parts are shown in section;

FIG. 2 is an enlarged sectional view of the torque control valve shown in FIG. 1;

FIG. 3 is an enlarged partial section view of the torque control valve along line A—A of FIG. 2;

FIG. 4 is a front view of a drum brake of the type with two floating shoes according to a second embodiment and comprising partial sections;

FIG. 5 is an enlarged sectional view of the torque control valve of FIG. 4;

FIG. 6 is a front view of a drum brake of the duo servo type according to a third embodiment and exhibiting in section the torque control valve;

FIG. 7 is an enlarged sectional view of the torque control valve of FIG. 6; and

FIG. 8 is an enlarged sectional view of the torque control valve of FIG. 6 along line B—B of FIG. 7.

The drum brake shown in FIGS. 1 to 3 comprises a brake supporting plate 10 provided for association to a fixed portion of the vehicle (not shown). This supporting plate 10 receives in sliding motion two shoes 12 and 14 comprising on their periphery a friction material 16 retained on the shoes by means of rivets or equivalent (not shown). The shoes 12 and 14 are maintained applied to the supporting plate 10 by means of springs 18. The ends 20 and 22 respectively of the shoes 12 and 14 are maintained applied to a crosspiece 24 by means of a spring 26. The crosspiece 24 is free to move relative to the supporting plate 10. The other two ends 28 and 30 respectively of the shoes 12 and 14 are applied by means of a spring 32 respectively to a brake motor 38 and a torque control valve 40. The brake motor 38 and the control valve 40 are effected in the same body 42 fixed to the supporting plate 10. The shoe 12 is disposed so as to become frictionally engaged with a drum rotating in the direction of the arrow C by the action of the brake motor 38. By reaction across the crosspiece 24, the shoe 14 is likewise urged into frictional engagement with the rotating drum (not shown). The reaction force, representative of the torque generated by frictional engagement, is transmitted by the shoe 14, more precisely by its ends 30, to the control valve 40.

The torque control valve 40 comprises a hydraulic stop unit 48 formed by a main piston 50 mounted slidingly in a bore 52 of the body 42, and a reaction chamber 46 defined between the piston 50 and the bottom of the bore 52.

As shown in FIGS. 2 and 3, the body 42 bears an inlet port 44, capable of being connected to a driving pressure source such as, for example, the master cylinder of a vehicle (not shown), which opens into the reaction chamber 46. The main piston 50 is urged in the direction of the arrow J, by a spring 54 bearing on the bottom of the bore 52, towards the rest position (that is, when the brake is released) against a mechanical stop. This mechanical stop comprises a bar 56, with a washer 62, a spring 60 and a washer 68 in abutment with a circlip 64 mounted in a groove 66 in the body 42, the spring 60 having a force greater than the force of the spring 54 to maintain the bar 56 in abutment with a projection 58 of the body 42. The main piston, on its face opposed to the reaction chamber 46, is in contact by a surface 78, with a bearing piece 70, centered on the main piston by means of two projections 72 mounted in a clearance 74 of said piston. The bearing piece 70 comprises a diametrical groove 76 of a depth greater than the sum of the thickness "e" of the bar 56 and the distance "a" defined between the main piston 50 in the rest position and the bottom of the reaction chamber 46. The bearing piece 70 cooperates, by its face opposed to the main piston 50, with the end 30 of the shoe 14 (see FIG. 1). The bearing piece 70 comprises two projections 80 capable of coming into abutment with the washer 62 to prevent the bearing piece 70 from becoming disengaged from the main piston 50. A protective cap 34 of elastic material is mounted between the bearing piece 70 and the washer 68.

A cut-off valve 84 is mounted in the main piston 50 coaxially with the latter. The cut-off valve 84 is formed by a ball 86 capable of coming into abutment with a seat 88 defined on the piston 50 by the action of a spring 90 bearing on a projection 92 of the main piston 50. The cut-off 84 is in communication on the one hand with the reaction chamber 46 and therefore with the inlet port 44 and on the other hand with a decompression chamber 94 formed between the main piston 50 and an auxiliary piston 96 mounted in a bore 82 formed in the main piston 50 and coaxial with the latter. The auxiliary piston 96 bears on one of its ends a driver 98 maintaining the ball 86 removed from its seat 88 when the main piston 50 is in its rest position. A spring 100 bearing on the main piston 50 maintains the auxiliary piston 96 in abutment with the bar 56.

The brake motor 38 comprises a work piston 110 mounted slidingly in a bore 112 of the body 42 and defining with the bottom of said bore a work chamber 102. The chamber 102 is connected to the decompression chamber 94 of the valve 40 by means of a passage 108 effected in the body 42 and opening into a circular groove 106 effected in the same body 42; into this groove 106 likewise there opens a diametrical passage 104 formed in the piston 50 and connected to the decompression chamber 94. The piston 110 is in contact by its face opposite the work chamber 102, with a bearing piece 116, itself bearing on the shoe 12 (see FIG. 1) by the action of a spring 114 bearing on the one hand on the body 42 and on the other hand on the bottom of a groove formed in the piston 110.

The bore 82 of the main piston 50 and the bottom of this bore 82 placed opposite the auxiliary piston 96 form, as will be seen more precisely during the description of operation, a movable portion of the decompression chamber 94. This movable portion is urged on the one hand by first actuating means formed by the main piston in contact with the shoe 14 across the bearing piece 70 and on the other hand by second actuating means formed by the main piston 50 responsive to the pressure prevailing in the reaction chamber 46.

The drum brake which has just been described referring to FIGS. 1 to 3 operates in the following manner:

At rest, when no driving pressure is applied to the inlet port 44, the different elements constituting the brake occupy the positions shown in the figures.

When a driving pressure is applied in the reaction chamber 46 across the port 44, this is likewise applied to the work piston 110 via the open cut-off valve 84, via the decompression chamber 94 then by the passage 104, the groove 106, the passage 108 and the work chamber 102. When the driving pressure and therefore the work pressure prevailing in the chamber 102 is sufficient to overcome the force of the spring 32, the piston 110 slides in its bore 112 in the direction of the arrow B to urge the shoe 12 into frictional engagement against a drum (not shown) rotating in the direction of the arrow C. By reaction across the crosspiece 24, the shoe 14 is likewise urged into frictional engagement. The frictional reaction force F of the shoe 14 is applied to the bearing piece 70 and therefore to the main piston 50. When the force F becomes greater than the force generated by the driving pressure on the main piston 50 increased by the force of the spring 54, the assembly of main piston 50 and bearing piece 70 moves in the direction of the arrow H. The auxiliary piston 96 remains stationary, for it is maintained in abutment with the bar 56 by the work pressure prevailing in the decompression chamber 94 and by the spring 100. The ball 86, bearing on the driver 98 which is itself fixed, remains fixed. The seat 88 being fixed on the main piston 50 moves with the latter by the action of the force F in the direction of the arrow H. The seat 88 then comes to bear on the ball 86 and cuts off the decompression chamber 94 from the reaction chamber 46 and therefore cuts off the work chamber 102 from the inlet port 44.

When the work pressure prevailing in the work chamber 102 and in the decompression chamber 94 is such that the force F is precisely balanced by the force generated by the driving pressure on the main piston 50 increased by the force of the spring 54, the main piston stops.

If the force F decreases or if the driving pressure increases, the main piston 50 moves in the direction of the arrow J and permits, by opening of the cut-off valve 84, an increase in pressure in the decompression chamber 94 and therefore in the work chamber 102 until the force F again balances the force generated by the driving pressure applied to the main piston 50.

If the force F becomes greater than the force generated by the driving pressure applied to the main piston 50, the latter moves in the direction of the arrow H and the volume of the decompression chamber 94 increases owing to the relative movement of the main piston 50 and the auxiliary piston 96. This increase in volume of the decompression chamber 94 causes a reduction in pressure in the work chamber 102. The force transmitted by the work piston 110 to the shoe 12 decreasing, the reaction force F likewise decreases. The main piston 50 moves until the work pressure is such that the force F is precisely balanced by the force generated by the driving pressure applied to the main piston 50.

On release of the driving pressure, during a first period the main piston 50 moves in the direction of the arrow H to increase the volume of the decompression chamber 94 thus decreasing the pressure in the work chamber 102, until the main piston bears on the bottom of the reaction chamber 46. During a second period the ball 86 subjected to a work pressure greater than the driving pressure moves counter to the springs 90 and, playing the part of discharge valve, permits the fluid contained in the decompression chamber 94 and in the work chamber 102 to flow out towards the inlet port 44 through the reaction chamber 46.

When the driving pressure and therefore the work pressure are such that the force generated by the work piston is less than the force of the spring 32, the shoes are removed from the rotating drum and consequently the reaction force F becomes zero. The main piston 50 is then driven back towards its initial rest position bearing on the bar 56 by the action of the spring 54, the ball 86 being removed from its seat 88 by the driver 98.

During reversing, the drum rotating in the reverse direction to arrow C, the driving pressure applied to the main piston 50 tends to displace the latter in the direction of the arrow J. When the force generated on the main piston 50 by the driving pressure is greater than the force of the spring 60, the assembly of main piston-auxiliary piston 96-bar 56-washer 62 and bearing 70 is displaced counter to the spring 60. This displacement induces frictional engagement of the shoe 14 against the rotating drum (not shown) and, by reaction across the crosspiece 24, frictional engagement of the shoe 12 against the rotating drum (not shown). The frictional reaction of the shoe 12 is transmitted by its end 28 to the work piston 112 which comes into abutment with the bottom of the work chamber 102, thus ensuring a fixed stop for the shoe 12.

The invention thus allows one to have a brake torque while running forwards which is controlled permanently as a function of the driving pressure. In particular, the diameter of the work piston is selected so that the reaction force generated by said work piston urged by the driving pressure is always greater than the force generated by the driving pressure applied to the main piston, in such a way that the work pressure is permanently controlled by the cut-off valve 84 and by the decompression chamber 94, that is, by the main piston 50. This ensures, in a continuous manner, monitoring of the torque-driving pressure relationship which it is wished to obtain. The diameter of the work piston will be such that the brake will be capable of providing the desired torque even in the case where the friction coefficient of the lining would reach a predetermined lower limit, distinctly lower than the nominal friction coefficient of the lining.

A second embodiment of a drum brake according to the invention has been shown in FIGS. 4 and 5. In this second embodiment, the parts fulfilling functions approximately identical with parts of the first embodiment have been designated by the same reference numbers increased by 200.

The drum brake shown in FIGS. 4 and 5 comprises a brake supporting plate 210 provided for association to a fixed portion of the vehicle (not shown). This supporting plate 210 receives in sliding motion two shoes 212 and 214 comprising on their periphery a friction material 216 retained on the shoes by means of rivets or equivalent (not shown). The shoes 212 and 214 are maintained applied to the supporting plate 210 by means of springs 218. The ends 220 and 222 respectively of the shoes 212 and 214 are maintained applied to an anchoring device 320 by means of a spring 226. The anchoring device 320 is formed by a control valve 240 comprising a body 242 fixed on the supporting plate 210. The other two ends 228 and 230 respectively of the shoes 212 and 214 are applied by means of a spring 232 to a brake motor 238. The brake motor 238 is fixed on the supporting plate 210. The shoes 212 and 214 are disposed so as to become frictionally engaged with a rotating drum (not shown) by the action of the brake motor 238 which urges apart the ends 228 and 230 respectively of the shoes 212 and 214. The reaction forces representative of the torque generated by frictional engagement of the shoes 212 and 214 are transmitted to the control valve 240 by the ends 220 and 222 respectively of the shoes 212 and 214.

The torque control valve 240 comprises a hydraulic stop unit 248 formed by a main piston 250 mounted slidingly in a bore 252 of the body 242 and a reaction chamber 246 defined between the piston 250 and the bottom of the bore 252.

As shown in FIG. 5, the body 242 bears an inlet port 244, capable of being connected to a driving pressure source such as, for example, the master cylinder of a vehicle (not shown) which opens into the reaction chamber 246. The main piston 250 is urged in the direction of the arrow B by a spring 254 bearing on the bottom of the bore 252, towards the rest position (that is, when the brake is released) against a mechanical stop. This mechanical stop comprises a washer 268 bearing on a circlip 264 mounted in a groove 266 in the body 242. The main piston, on its face opposite the reaction chamber 246, is in contact by a surface 278 with a bearing piece 270 centered on the main piston by means of a projection 272 mounted in a clearance 274 of the piston 250. The bearing piece 270 cooperates, by its face opposite the main piston 250, with the end 220 of the shoe 212 (see FIG. 4). A protective cap 234 of elastic material is mounted between the bearing piece 270 and the washer 268.

The main piston 250 comprises a projection 322 on which the end 222 of the shoe 214 comes to bear via a second bearing piece 324 (see FIG. 4). Between the second bearing piece 324 and the body 242 of the control valve 240 is mounted a protective cap of elastic material.

A cut-off valve 284 is mounted in the main piston 250 coaxially with the latter. The cut-off valve 284 comprises a ball 286 capable of coming to bear on a seat 288 fixed on the piston 250, by the thrust of a spring 290 bearing on the piston 250. The cut-off valve 284 is connected on the one hand to the reaction chamber 246 by the channel 326 formed in the main piston 250 and therefore to the inlet port and on the other hand to a decompression chamber 294 formed between the main piston 250 and an auxiliary piston 296 mounted in a bore 282 formed in the main piston 250 and coaxial with the latter. The auxiliary piston 296 bears on one of its ends a driver 298 maintaining the ball 286 removed from its seat 288 when the main piston 250 is in its rest position. The auxiliary piston 296 is maintained fixed relative to the body 242 of the control valve 240 by means of a hollow split pin 328 passing through the auxiliary piston 296 and retained at its two ends by bores 330 and 332 formed in the body 242. The main piston 250 comprises a radial slot 334 into which the pin 328 extends. One surface 336 of the slot 334 is arranged so that the distance between this surface 336 and the pin 328 is greater than the distance "b" defined between the main piston 250 and the bottom of the reaction chamber 246, when the main piston 250 is in its rest position.

As shown in FIGS. 4 and 5, the brake motor 238 comprises two work pistons 310 and 342 mounted slidingly in a bore 312 of a body 344 of the brake motor 238, the bore 312 and the two pistons 31 and 342 defining a work chamber 302. The chamber 302 is connected to the decompression chamber 294 of the valve 240 by means of a channel (not shown) connected on the one hand to a supply port 340 provided on the body 344 and opening into the work chamber 302 and on the other hand to an outlet port 338 formed on the body 242 of the valve 240; the outlet port 338 being connected to the decompression chamber 294 through the slot 334 and the split pin 328.

The pistons 310 and 342 are urged apart by a spring 314 bearing on recesses formed in the pistons 310 and 342. Protective caps are mounted between the pistons 310 and 342 and the body 344 of the brake motor 238.

In the same way as in the first embodiment, the bore 282 of the main piston 250 and the bottom of this bore 282 placed opposite the auxiliary piston 296 form, as will be seen more precisely during the description of operation, a movable portion of the decompression chamber 294. This movable portion is urged on the one hand by first actuating means formed by the main piston 250 in contact with the shoe 212 through the bearing piece 270 and on the other hand by second actuating means formed by the main piston 250 responsive to the pressure prevailing in the reaction chamber 246.

The drum brake which has just been described referring to FIGS. 4 and 5 operates in the following manner:

At rest, when no driving pressure is applied to the inlet port 244, the different elements constituting the brake occupy the positions shown in FIGS. 4 and 5.

When a driving pressure is applied in the reaction chamber 246 through the port 244, this is likewise applied to the work pistons 310 and 342 via the open cut-off valve 284, via the decompression chamber 294 then by the outlet port 338, by a channel (not shown), and by the supply port 340 opening into the work chamber 302.

When the driving pressure and therefore the work pressure prevailing in the chamber 302 is sufficient to overcome the force of the spring 232, the pistons 310 and 342 slide in the bore 312 apart from each other to urge the shoes 212 and 214 into frictional engagement against a drum (not shown) rotating in the direction of the arrow C.

When the reaction force F applied by the end 220 of the shoe 212 to the main piston 250 becomes greater than the force generated by the driving pressure applied to the main piston increased by the force of the spring 254 and increased by the bearing force of the shoe 214 on the projection 322, the assembly of main piston and bearing piece 270 moves in the direction of the arrow H. The auxiliary piston 296 being maintained fixed by the pin 328, the ball 286 bearing on the driver 298, itself fixed, remains stationary. The seal 288 being fixed on the main piston 250 moves with the latter by the action of the reaction force F in the direction of the arrow H. The seat then comes to bear on the ball 286 and cuts off the decompression chamber 294 from the reaction chamber 246 and therefore cuts off the work chamber 302 from the inlet port 244.

When the work pressure prevailing in the chamber 302 and in the decompression chamber 294 becomes such that the reaction force F is precisely balanced by the force generated by the driving pressure on the main piston 250 increased by the force of the spring 254 and by the bearing force of the shoe 214 on the projection 322, the main piston stops.

If the force F decreases or if the driving pressure increases, the main piston 250 moves in the direction of the arrow B and permits, by opening of the cut-off valve 284, an increase in pressure in the decompression chamber 294 and therefore in the work chamber 302 until the force F again balances the force generated by the driving pressure applied to the main piston 250.

If the force F becomes greater than the force generated by the driving pressure applied to the main piston 250, the latter moves in the direction of the arrow H and the volume of the decompression chamber 294 increases due to the relative movement of the main piston 250 and the auxiliary piston 296. This increase in volume of the chamber 294 causes a reduction in pressure in the work chamber 302. The forces transmitted by the work pistons 310 and 342 decreasing, the reaction force F likewise decreases. The main piston moves until the work pressure is such that the force F is precisely balanced by the force generated by the driving pressure applied to the main piston 250.

On release of the driving pressure, during a first period the main piston moves in the direction of the arrow H to increase the volume of the decompression chamber 294, thus decreasing the work pressure prevailing in the work chamber 302, until the main piston 250 bears on the bottom of the reaction chamber. During a second period, the ball 286 subjected to a work pressure greater than the driving pressure moves counter to the spring 290 and, playing the part of discharge valve, permits the fluid contained in the decompression chamber 294 and in the work chamber 302 to flow out towards the inlet port 244 through the reaction chamber 246.

When the driving pressure and therefore the work pressure are such that the force generated by the work pistons is less than the force of the spring 232, the shoes are removed from the rotating drum and consequently the reaction force F is reduced to zero. The main piston 250 is then driven back towards its initial rest position bearing on the circlip 264 via the washer 268 by means of the spring 254, the ball 286 being removed from its seat 288 by the driver 298.

During reversing, the drum rotating in the reverse direction to the arrow C, the cut-off valve 284 being open, the work chamber 302 receives the driving pressure, which induces separation of the two work pistons 310 and 342. This displacement induces frictional engagement of the shoes 212 and 214 against the rotating drum (not shown); the reaction force which appears on the shoe 214 is applied to the projection 322 of the main piston by the end 222 of the shoe 214. The main piston 250 being on its mechanical stop consisting of the circlip 264 and the washer 268 remains stationary. No movement of the main piston 250 being possible, the driving pressure is transmitted completely to the brake motor 238. The drum brake then operates as a brake without torque control.

In the same way as for the first embodiment, the invention permits one to have a brake torque while running forwards controlled permanently as a function of the driving pressure. In particular, the diameter of the work pistons 310 and 342 is selected so that the reaction force generated by the work pistons urged by the driving pressure is always greater than the force generated by the driving pressure applied to the main piston, in such a way that the work pressure is permanently controlled by the decompression chamber, that is, by the main piston 250. This ensures, in a continuous manner, monitoring of the torque-driving pressure relationship which it is wished to obtain. The diameter of the work pistons will be such that the brake will be capable of providing the desired torque even in the case where the friction coefficient of the lining would reach a predetermined lower limit distinctly lower than the nominal friction coefficient of the lining.

A third embodiment of a drum brake according to the invention has been shown in FIGS. 6, 7 and 8. In this third embodiment, the parts fulfilling functions approximately identical with parts of the first embodiment have been designated by the same reference numbers increased by 400.

The drum brake shown in FIGS. 6 to 8 comprises a supporting plate 410 provided for association to a fixed portion of the vehicle (not shown). This supporting plate 410 receives in sliding motion two shoes 412 and 414 comprising on their periphery a friction material 416 retained on the shoes by means of rivets or equivalent (not shown). The shoes 412 and 414 and maintained applied to the supporting plate 410 by means of springs 418. The ends 420 and 422 respectively of the shoes 412 and 414 are maintained applied to a crosspiece 424 by means of a spring 426. The crosspiece 424 is free to move relative to the supporting plate. The other two ends 428 and 430 respectively of the shoes 412 and 414 are applied by means of springs 432 respectively to a brake motor 438 and a control valve 440. The brake motor 438 and the control valve 440 are constructed in the same body 442 fixed on the supporting plate 410. The shoe 412 is disposed so as to become frictionally engaged with a rotating drum (not shown) by the action of the brake motor 438. By reaction across the crosspiece 424, the shoe 414 will likewise be urged into frictional engagement on the rotating drum (not shown). The reaction force representative of the torque generated by frictional engagement is transmitted by the shoe 414, more precisely by its end 430, to the control valve 440.

The torque control valve 440 comprises a hydraulic stop unit 448 formed by a main piston 450 mounted slidingly in a bore 452 of the body 442 and a reaction chamber 446 defined between the piston 450 and the bottom of the bore 452.

As shown in FIGS. 7 and 8, the body 442 bears an inlet port 444, formed in a plug 520, capable of being connected to a driving pressure source such as, for example, the master cylinder of a vehicle (not shown), which opens into an inlet chamber 521. This inlet chamber 521 is in communication with the reaction chamber 446 by means of a passage 528 formed in the body 442, a circular groove 530 formed in the bore 452, a passage 532 formed in the main piston 450, an auxiliary chamber 524 and an auxiliary valve 534 mounted in the main piston 450 coaxially with the latter. The auxiliary chamber 524 is formed between the bottom of a bore 474 formed in the main piston 450 and an inner piston 522 mounted in the bore 474 of the main piston 450. The main piston 450 is urged in the direction of the arrow G by a spring 454 bearing on the bottom of the bore 452, towards the rest position (that is, when the brake is released) against a mechanical stop. This mechanical stop comprises a washer 468 bearing on a circlip 464 mounted in a groove 466 in the body 442. The main piston on its face opposite the reaction chamber 446 is in contact by a surface 478 with a bearing piece 470 centered on the main piston 450 by means of a projection 472 mounted in the bore 474 of the main piston. The bearing piece 470 cooperates, by its face opposite the main piston 450, with the end 430 of the shoe 414 (see FIG. 6). A protective cap 434 is mounted between the bearing piece 470 and the body 442. A spring 526 is mounted between the bearing piece 470 and the inner piston 522. The main piston 450 bears a seat 536 of the auxiliary valve 534. A ball 538 of the auxiliary valve is maintained removed from the seat 536, counter to a spring 540, by a driver 542 integral with the inner piston 522.

In the inlet chamber 521 is mounted a stepped piston 544 maintained in abutment on a shoulder 546 of the body 442 via a driver support 548 by means of a spring 550 placed in the inlet chamber 521 and bearing on the plug 520. The stepped piston 544 comprises a large diameter portion 552 sliding in a bore 554 formed in the body 442 and a small diameter portion 556 mounted in a bore 558 of the body 442. Between the large diameter portion 552 of the stepped piston, the small diameter portion 556 of the same stepped piston and the bore 554 of the body 442 is formed a chamber 560 which communicates with the atmosphere. The small diameter portion 556 of the stepped piston bears at its end a circular projection 562 which bears on a driver support 548 and on which bears a control piston 564 mounted in a bore 566 formed in the body 442. Said control piston 564 has a diameter less than the diameter of the small diameter portion 556 of the stepped piston 544. Between the body 442 and the control piston 564 is formed a control chamber 568. The control chamber 568 is connected to the reaction chamber 446 by a channel 570. The control piston 564 bears on its end placed opposite the stepped piston a diametrical groove 572 into which extends the driver support 548 formed by a bar. Between said control piston 564 and the stepped piston 544 is formed a decompression chamber 494. The stepped piston 544 bears a cut-off valve 484 formed by a ball 486 capable of coming to bear on a seat 488, defined on the stepped piston 544, by the thrust of a spring 490 bearing on a projection 492 of the stepped piston 544. The cut-off valve 484 is connected on the one hand to the inlet chamber 521 and on the other hand to the decompression chamber 494. The driver support 548 bears a driver 498 maintaining the ball 486 removed from its seat 488 when the stepped piston 544 is in its rest position, that is, when it bears on the shoulder 546 of the body 442 via the driver support 548.

The brake motor 438 comprises a work piston 510 mounted slidingly in a bore 512 of the body 442 and defining with the bottom of said bore a work chamber 502. The chamber 502 is connected to the decompression chamber 494 of the valve 440 by means of a passage 574 formed in the body 442 and opening into the decompression chamber 494. The piston 510 is maintained bearing on the end 428 of the shoe 412 by means of a spring 514 placed in the work chamber 502. A cap of elastic material is mounted between the body 442 and the piston 510 (see FIG. 6).

The small diameter end of the stepped piston 544 forms, as will be seen more precisely during the description of operation, a movable portion of the decompression chamber 494. The end of the control piston 564 placed opposite the stepped piston forms a second movable portion of the decompression chamber. These movable portions are urged on the one hand by first actuating means formed by the main piston 450 in contact with the shoe 414 and by the control piston 564 and on the other hand by second actuating means formed by the stepped piston 544 responsive to the pressure prevailing in the inlet chamber 521.

The drum brake which has just been described referring to FIGS. 6 to 8 operates in the following manner:

At rest, when no driving pressure is applied to the inlet port 444, the different elements constituting the brake occupy the positions shown in FIGS. 6 to 8.

When a driving pressure is applied to the inlet port 444, this is applied during a first period on the one hand to the work piston 510 via the inlet chamber 521 of the cut-off valve 484, open in the rest position, the decompression chamber 494, the channel 574 and the work chamber 502, and on the other hand to the main piston 540 via the channel 528, the groove 530, the channel 532, the auxiliary valve 540, open in the rest position of the inner piston 522, and via the reaction chamber 446. During a second period, when the force generated by the driving pressure applied to the inner piston 522 is greater than the force generated by the spring 526, said inner piston moves counter to the spring 526, which allows closing of the auxiliary valve 534, the driver 542 maintaining said valve 534 open being integral with the inner piston 522. The reaction chamber 446 is then cut off from the inlet port 444. During a third period, when the driving pressure and therefore the work pressure prevailing in the chamber 502 is sufficient to overcome the force of the springs 432, the piston 510 slides in its bore 512 in the direction of the arrow L to urge the shoe 412 into frictional engagement against a drum (not shown) rotating in the direction of the arrow C. By reaction across the crosspiece 424, the shoe 414 is likewise urged into frictional engagement. The frictional reaction force F of the shoe 414 is applied to the bearing piece 470 and therefore to the main piston 450.

When the reaction force F becomes greater than the force generated by the pressure prevailing in the reaction chamber 446 on the main piston 450, increased by the force of the spring 454, the assembly of main piston 450 and bearing piece 470 moves in the direction of the arrow H. The driving pressure being always applied to the inner piston, the auxiliary valve remains closed. The main piston 450 compresses the fluid contained in the chamber 446, in the channel 570 and in the control chamber 568. When the force f generated by the control piston 564 subjected to the pressure prevailing in the control chamber 568 becomes greater than the force generated by the stepped piston subjected to the driving pressure increased by the force of the spring 550, the assembly of control piston 564 and stepped piston 552 moves counter to the spring 550. The driver support 548 remains bearing on the shoulder 546 of the body 442 by means of the spring 490 via the ball 486 and the driver 498, and the assembly of ball, driver and driver support therefore remains fixed. The seat 488 being fixed on the stepped piston 544 moves with the latter by the action of the control piston. The seat 488 then comes to bear on the ball 486 and cuts off the decompression chamber 494 from the inlet chamber 521 and therefore cuts off the work chamber 502 from the inlet port 444.

When the force f generated by the control piston 564 is precisely balanced by the force generated by the stepped piston subjected to the driving pressure on its large diameter portion 522 increased by the force of the spring 550, the stepped piston stops.

If the force F and therefore the force f decrease or if the driving pressure increases, the stepped piston 544 moves in the direction of the arrow K and permits, by opening of the cut-off valve 484, an increase in pressure in the decompression chamber 494 and therefore in the work chamber 502 until the force f again balances the force generated by the driving pressure applied to the stepped piston 544. If the force f generated by the pressure prevailing in the control chamber 568 becomes greater than the force generated by the driving pressure applied to the stepped piston 544, the stepped piston 544 moves still further counter to the spring 550. The volume of the decompression chamber 494 increases due to the fact that the diameter of the control piston 564 is less than the diameter of the small diameter portion 556 of the stepped piston 544. This increase in volume of the decompression chamber 494 causes a reduction in pressure in the work chamber 502. The force transmitted by said work piston 510 to the shoe 412 decreases, and therefore the reaction force F applied to the main piston 450 likewise decreases, which causes a reduction in the pressure in the reaction chamber 546 and therefore in the control chamber 568.

On release of the driving pressure, during a first period the stepped piston moves in the direction of the force f to increase the volume of the decompression chamber 494 and therefore decrease the work pressure prevailing in the chamber 502, until the stepped piston 544 has come to bear on the plug 520 by its large diameter end 552. During a second period, under the effect of the work pressure on the one hand and the driving pressure on the other hand, the cut-off valve 484 plays the part of a discharge valve, allowing the fluid contained in the work chamber 502 and in the decompression chamber 494 to flow out towards the inlet chamber 521 and therefore towards the inlet port 444.

When the driving pressure and therefore the work pressure are such that the force generated by the work piston is less than the force of the springs 432, the shoes are removed from the rotating drum and consequently the reaction force F is reduced to zero. The main piston 450 is then driven back towards its rest position bearing on the circlip 464 by means of the spring 454. The pressure prevailing in the reaction chamber having thus decreased, the control piston 564 no longer opposes movement of the stepped piston 544 which returns to its rest position by means of the spring 550. This movement of the stepped piston 544 ensures opening of the cut-off valve 484, the ball 486 being removed from its seat 488 counter to the spring 490 by means of the driver 498. When the driving pressure is such that the force generated by it on the inner piston 522 is less than the force provided by the spring 526, the inner piston 522 is driven back by said spring 526, which ensures opening of the auxiliary valve by means of the driver 542 removing the ball 538 from its seat 536 counter to the spring 540, thus putting the reaction chamber 446 and therefore the control chamber 568 in communication with the inlet port 444.

During reversing, the drum rotating in the reverse direction to the arrow C, the driving pressure is applied to the work piston 510, to the main piston 450 and to the inner piston 522. In the same way as in operation during forward running of the vehicle, the inner piston 522 moves counter to the spring 526 and comes to bear on the bearing piece 470. When the force generated by the driving pressure on the inner piston 522 becomes greater than the force of the spring 432, the assembly of inner piston 522 and bearing piece 470 moves in the bore 474 of the main piston 450 to urge the shoe 414 into frictional engagement against the rotating drum (not shown) and, by reaction across the crosspiece 424, to urge the shoe 412 into frictional engagement against the same rotating drum (not shown). The frictional reaction of the shoe 412 is transmitted by its end 428 to the work piston 512 which comes to bear on the bottom of the work chamber 502, thus ensuring a fixed stop for the shoe 412.

In the same way as in the two preceding embodiments, it appears from the preceding description that the torque control valve is capable of ensuring a brake torque controlled permanently as a function of the driving pressure.

It appears likewise from the preceding description that the control valve forming an integral part of the brake does not necessitate modifications to the hydraulic connections and that the overall dimensions of the brake and hence its installation on the vehicle are not affected.

It goes without saying that the three drum brakes which have just been described by way of example do not limit the scope of the invention and that the latter can be applied to different variants of drum brakes, in particular the brakes may comprise automatic wear compensating devices or else parking brake controls. Modifications may likewise be envisaged in the torque control device itself, particularly as far as the structure and form of the different elements which constitute it are concerned.

We claim:

1. A drum brake for a vehicle and of the type comprising two shoes actuated by a hydraulic brake motor and a fluid inlet port for connection to a driving pressure source, said hydraulic brake motor being dimensioned to compensate for a reduction in efficiency of braking to a predetermined lower brake torque limit, the brake comprising a torque control valve defined in a fixed housing which accommodates the hydraulic brake motor and a cut-off valve inserted between said fluid inlet port and said hydraulic brake motor, the torque control valve including a variable volume decompression chamber communicating with said hydraulic brake motor, a movable portion of said decompression chamber maintained in equilibrium between first actuating means operatively connected to one of said shoes and second actuating means responsive to a driving pressure established at said inlet port, said cut-off valve being driven by said movable portion, a hydraulic stop provided in said fixed body by means of a reaction chamber filled with fluid and a main piston defining a movable wall of said reaction chamber on which said one shoe bears, a filling connection being attained between said reaction chamber and inlet port, spring means urging said main piston toward a mechanical stop defining a rest position thereof and the spring means acting counter to the reaction force developed by said one shoe, the mechanical stop comprising a spring coaxial with said main piston and cooperating with said main piston and a fixed support carried by said housing of said torque control valve, to permit limited outward movement of said main piston relative to said housing and thus actuate said one shoe for brake application during reverse movement of the vehicle.

2. The drum brake according to claim 1, characterized in that the main piston cooperates with the coaxial spring via a transverse bar and annular element pressed by the coaxial spring against a radial projection of said housing of the control valve, said bar traversing a diametrical groove of said main piston to constitute a stop for an auxiliary piston.

3. The drum brake according to claim 1, characterized in that the spring means is disposed in said reaction chamber.

4. The drum brake according to claim 1, characterized in that the decompression chamber and cut-off valve are disposed within said main piston.

5. The drum brake according to claim 4, characterized in that the reaction chamber communicates directly with the inlet port and said cut-off valve is disposed between said reaction chamber and decompression chamber.

6. The drum brake according to claim 5, characterized in that the decompression chamber is formed between said main piston and an auxiliary piston which is fixed according to at least the direction of operation during forward movement of the vehicle.

7. The drum brake according to claim 6, characterized in that the said main piston, cut-off valve, and auxiliary piston are mounted coaxially.

8. The drum brake according to claim 6, characterized in that the auxiliary piston includes a driver cooperating with said cut-off valve as a function of the relative positions of said main piston and auxiliary piston, and cut-off valve being maintained open by means of said driver when said main piston is in an inactive position.

9. The drum brake according to claim 1, further comprising a connecting port providing communication between said decompression chamber and brake motor.

10. A drum brake for a vehicle and of the type comprising two shoes actuated by a hydraulic brake motor and a fluid inlet port for connection to a driving pressure source, the brake further comprising a torque control valve formed in a fixed housing accommodating a cut-off valve located between said inlet port and said hydraulic brake motor, said cut-off valve being operable by a movable portion maintained in equilibrium between first actuating means operably connected to one of said shoes and second actuating means responsive to a driving pressure applied at said inlet port, characterized in that said control valve contains a variable volume decompression chamber in permanent communication with the hydraulic brake motor and communicating with the fluid inlet port by way of said cut-off valve, the changes in volume of the decompression chamber obtained by displacement of the movable portion, such displacement in a closure direction of the cut-off valve corresponding to an increase of the volume of the decompression chamber and the displacement able to occur after closure of the cut-off valve.

11. The drum brake according to claim 10, characterized in that the said hydraulic brake motor is dimensioned to compensate for reduction in efficiency of braking to a predetermined lower brake torque limit.

12. The drum brake according to claim 10, characterized in that the drum brake further comprising a hydraulic stop provided in said fixed housing by means of a reaction chamber filled with fluid and a main piston defining a movable wall of said reaction chamber on which said one shoe bears, a filling connection being attained between said reaction chamber and inlet port.

13. The drum brake according to claim 12, characterized in that spring means urges said main piston toward a mechanical stop defining a rest position thereof, said spring means acting counter to the reaction force developed by said one shoe.

14. The drum brake according to claim 13, characterized in that said spring means is disposed in said reaction chamber.

15. The drum brake according to claim 13, characterized in that the housing of said torque control valve also accommodates the brake motor.

16. The drum brake according to claim 15, wherein said mechanical stop comprises a spring coaxial with said main piston and cooperating with said main piston and a fixed support carried by said housing of said torque control valve, to permit limited outward movement of said main piston relative to said body and thus actuate said one shoe for brake application during reverse movement of said vehicle.

17. The drum brake according to claim 16, characterized in that said main piston cooperates with the coaxial spring via a transverse bar and annular element pressed by the coaxial spring against a radial projection of said housing of the control valve, said bar traversing a diametrical groove of said main piston to constitute a stop for the auxiliary piston.

18. The drum brake according to claim 12, characterized in that said decompression chamber and said cut-off valve are disposed within said main piston.

19. The drum brake according to claim 18, characterized in that said reaction chamber communicates directly with said inlet port and said cut-off valve is disposed between said reaction chamber and decompression chamber.

20. The drum brake according to claim 19, characterized in that said decompression chamber is formed between said main piston and an auxiliary piston immobilized in accordance with at least the direction of operation during forward movement of the vehicle.

21. The drum brake according to claim 20, characterized in that said auxiliary piston is maintained fixed relative to said housing of the torque control valve by means of a pin anchored in said housing and traversing said main piston by a radial slot extending in the axial direction of the main piston to allow displacements of the main piston relative to said fixed housing.

22. The drum brake according to claim 19, characterized in that said main piston, cut-off valve, and auxiliary piston are mounted coaxially.

23. The drum brake according to claim 22, characterized in that said auxiliary piston includes a driver cooperating with said cut-off valve as a function of the relative positions of said main piston and auxiliary piston, said cut-off valve being maintained open by the driver when said main piston is in a deactivated piston.

24. The drum brake according to claim 10, further comprising a connecting port providing communication between said decompression chamber and brake motor.

25. The drum brake according to claim 10, wherein the hydraulic brake motor is disposed between two adjacent ends of said shoes, the torque control valve and fixed housing disposed between the other two ends of said two shoes.

26. The drum brake according to claim 12, characterized in that said main piston comprises a projection on which the other of said shoes comes to bear.

27. The drum brake according to claim 12, wherein said first actuating means includes said main piston which comprises an inner piston capable of moving axially counter to elastic means by the action of said driving pressure and an auxiliary valve placed in the filling connection connecting said inlet port to said reaction chamber, said auxiliary valve being maintained open by said inner piston when the inner piston is in a rest position.

28. The drum brake according to claim 27, wherein the movable portion of the decompression chamber consists of a stepped piston enclosing said cut-off valve and movable within a bore having corresponding steps, said second actuating means including an inlet chamber connected to said inlet port and formed by a larger diameter portion of said stepped piston.

29. The drum brake according to claim 28, characterized in that said first actuating means comprises a control piston movable in a housing opening and disposed between said reaction chamber and decompression chamber, said control piston constituting a further movable portion of said decompression chamber.

30. The drum brake according to claim 29, characterized in that said control piston has a smaller diameter than the smallest diameter of said stepped piston, said control piston and stepped piston cooperating in displacement to ensure a variation in volume of said decompression chamber.

31. The drum brake according to claim 30, characterized in that a spring is mounted in said inlet chamber and urges said stepped piston counter to said control piston in order for said stepped piston to bear in a rest position on a fixed shoulder via a driver support of said cut-off valve, the cut-off valve being maintained open in said rest position by a driver mounted on said driver support.

32. The drum brake according to claim 31, characterized in the stepped piston and control piston are normally in contact at opposed faces thereof, and said driver support is mounted in a diametrical groove of said control piston, said diametrical groove having a depth such that the distance at rest between said driver support and a bottom of said groove is greater than the axial distance between a seat of said cut-off valve and a movable element of said cut-off valve when said stepped piston is in the rest position.

33. The drum brake according to claim 27, characterized in that a bore formed in said main piston and receiving said inner piston is extended in a direction of said one shoe to allow urging of said one shoe by said inner piston for brake application during reverse movement of the vehicle.

34. The drum brake according to claim 27, characterized in that said hydraulic brake motor, hydraulic stop, decompression chamber, and the first and second actuating means are accommodated in said fixed housing.

* * * * *